United States Patent
Otto et al.

[11] Patent Number: 6,092,637
[45] Date of Patent: *Jul. 25, 2000

[54] CLUTCH WITH A SEALING ELEMENT, IN PARTICULAR AN ELASTOMER SEAL FOR USE IN ANNULAR CYLINDERS SUCH AS IN CLUTCHES

[75] Inventors: Thomas Otto, Gochsheim; Boleslaw Tulaczko, Niederwerrn; Angelika Ebert; Herbert Voit, both of Schweinfurt, all of Germany

[73] Assignee: Fichtel & Sachs AG, Schweinfurt, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/889,392

[22] Filed: Jul. 8, 1997

[30] Foreign Application Priority Data

Jul. 9, 1996 [DE] Germany .......................... 196 27 617

[51] Int. Cl.[7] .............................. F16D 25/00; F16J 15/32; F16J 9/20
[52] U.S. Cl. ...................... 192/85 CA; 277/572; 277/439
[58] Field of Search .............................. 192/85 CA, 91 A, 192/98; 277/436, 437, 438, 439; 92/107, 240

[56] References Cited

U.S. PATENT DOCUMENTS

| | | | |
|---|---|---|---|
| 2,549,818 | 4/1951 | Joy . | |
| 3,379,445 | 4/1968 | Fisher ...................................... | 277/577 |
| 3,655,204 | 4/1972 | Sievenpiper ............................. | 277/572 |
| 4,518,070 | 5/1985 | Ooka . | |
| 4,566,701 | 1/1986 | Bomgardner .......................... | 277/572 X |
| 4,601,235 | 7/1986 | Roberts ................................ | 277/437 X |
| 4,660,694 | 4/1987 | Nix et al. ............................. | 192/85 CA |
| 4,781,024 | 11/1988 | Nakamura ............................. | 277/572 X |
| 4,827,834 | 5/1989 | Leigh-Monstevens ......... | 192/85 CA X |
| 4,915,202 | 4/1990 | Leigh-Monstevens et al. ... | 192/85 CA |
| 5,169,160 | 12/1992 | Gaskill et al. .......................... | 277/438 |
| 5,193,433 | 3/1993 | Reimer ................................. | 92/107 X |
| 5,211,099 | 5/1993 | Grosspietsch et al. ............... | 192/98 X |
| 5,445,257 | 8/1995 | Grabis ................................. | 192/85 CA |
| 5,458,224 | 10/1995 | Takano ................................. | 192/85 CA |
| 5,547,058 | 8/1996 | Parzefall et al. .................... | 192/85 CA |
| 5,743,370 | 4/1998 | Thomire ............................... | 192/85 CA |
| 5,779,019 | 7/1998 | Grosspietsch et al. ............... | 192/85 C |
| 5,833,245 | 11/1998 | Gallagher ............................ | 277/438 X |
| 5,855,375 | 1/1999 | Wilcox et al. ....................... | 277/572 X |
| 5,865,288 | 2/1999 | Thomire et al. .................... | 192/85 CA |

FOREIGN PATENT DOCUMENTS

| | | | |
|---|---|---|---|
| 2 688 560 | 9/1993 | France ............................... | 192/85 CA |
| 3245338 | 6/1984 | Germany . | |
| 4109125 | 9/1992 | Germany . | |
| 4129370 | 3/1993 | Germany . | |
| 4339652 | 6/1994 | Germany . | |
| 4439242 | 5/1995 | Germany . | |
| 4412927 | 10/1995 | Germany . | |
| 19609472 | 9/1997 | Germany . | |
| 62-188823 | 8/1987 | Japan ................................. | 192/85 CA |
| 2 273 541 | 6/1994 | United Kingdom .............. | 192/85 CA |

*Primary Examiner*—Charles A Marmor
*Assistant Examiner*—Roger Pang
*Attorney, Agent, or Firm*—Nils H. Ljungman & Associates

[57] ABSTRACT

A seal element, in particular an elastomer gasket for use in hydraulic annular cylinders, such as in clutches, with a radially outer and a radially inner seal lip, characterized by the fact that the seal lips are axially offset in relation to one another.

20 Claims, 4 Drawing Sheets

CLUTCH WITH A SEALING ELEMENT, IN PARTICULAR AN ELASTOMER SEAL FOR USE IN ANNULAR CYLINDERS SUCH AS IN CLUTCHES

BACKGROUND OF THE INVENTION

1. Field of the Invention

The present invention relates to a seal element, in particular an elastomer gasket for use in hydraulic annular cylinders, for example in slave cylinders of motor vehicles, such as in clutches, which seal element has a radially outer and a radially inner seal lip.

2. Background Information

A similar known seal element or sealing structure is disclosed in German Patent No. 41 09 125 A1, for example. This known structure describes a concentric slave cylinder for the hydraulic actuation of the clutch of a motor vehicle, which slave cylinder is realized in the form of an annular cylinder. The annular cylinder by means of which cylinder the release bearing is actuated, must be sealed radially externally with respect to the housing of the slave cylinder, and radially internally against the cylinder jacket which cylinder jacket surrounds the transmission drive shaft. An outer and an inner seal lip are provided for this purpose.

To make available a sufficient actuation travel, it must be possible for the annular piston to travel an appropriate distance. In order to insure that the result is a sufficient guide length for the annular piston, the slave cylinder must be realized so that it is sufficiently long.

The increasing optimization of the utilization of space in motor vehicles, which goes hand in hand with the increase in the number of models and the variety of optional equipment available, basically requires that all of the components be designed in a compact and space-saving manner. Consequently, a slave cylinder must have a minimal inserted length if this requirement is to be met. These two requirements are in direct competition with one another. In addition, while in the inserted position, the gasket of the annular piston must not impact axially against housing parts, so that no damage to the individual parts occurs.

A reduction of the length of the seal element described above would reduce the structural length of the slave cylinder to the same extent when the annular piston is inserted. For reasons of stability, there are inherent or natural limits on the possible reduction of the height of the gasket.

In other words, any reduction in the size of the annular piston-sealing element combination would reduce the size of the slave cylinder by the same extent. The slave cylinder need only be of sufficient length to receive the annular piston and sealing structure without having the sealing structure impact against the housing parts. Therefore, any reduction in sealing element size may result in a reduction in the slave cylinder size.

OBJECT OF THE INVENTION

The object of the invention is to improve the known gasket.

SUMMARY OF THE INVENTION

The present invention teaches that this object can be accomplished by the seal element described above, which seal element is characterized by the fact that the seal lips are axially offset from one another.

As a result of this configuration, the cylinder housing or cylinder jacket or cylinder wall surrounding a shaft can be bevelled at its mouth, a configuration which can save space in the axial direction. As a result of a bevelled or rounded mouth of the cylinder jacket, stresses at the transition points can be eliminated, which can make it possible to reduce the wall thickness while maintaining the same stability. The reduction of stress increases in proportion to the size of the radii.

In other words, the bevelling of the mouth of the cylinder jacket virtually eliminates stresses at the transition points where the cylinder jacket changes direction. This virtual elimination of stresses at the transition points can allow for the wall thickness of the cylinder jacket to be reduced, while the cylinder jacket maintains the same stability. The reduction of stresses at the transition points increases in proportion to the size of the radii of the cylinder jacket.

Preferably, the radially outer lip of the seal element or sealing structure can project beyond the radially inner lip of the seal element in the axial direction, so that the cylinder jacket can be expanded outwardly toward the transitional area of the cylinder housing, as a result of which expansion, the load-bearing cross section of the cylinder housing increases.

In other words, the bevelling of the cylinder jacket reduces the stresses at the transition points by providing an increased load-bearing cross section.

In one particularly preferred embodiment, the seal lips can be vulcanized to a cup-shaped or curved carrier, which carrier is designed to be axially attached on the end of the annular piston. The defined seat of the seal element is thereby specified by an interference fit between the carrier and the end of the annular piston. The carrier is used not only for a secure fastening of the seal element, but also simultaneously as a reinforcement, so that the size of the seal can be reduced in the axial direction, without thereby incurring any reduction in the stability of the seal. In one particularly preferred embodiment, the carrier is made of metal.

In particular, if the seal element is inserted in a slave cylinder with an annular piston for the hydraulic actuation of a motor vehicle clutch, the annular piston and the seal element can be realized in one piece. The annular piston is thereby preferably made of plastic and the seal element is molded onto the annular piston. As a result of this combined configuration, not only is the manufacture significantly simplified, but the number of parts which must be kept in inventory is also reduced, because instead of the two components required in similar known devices, only one component needs to be kept in inventory. In addition to the costs of maintaining an inventory, the assembly costs are also reduced, which means that the overall manufacturing costs can be reduced.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Several embodiments of the current invention are described in greater detail below with reference to the attached drawings wherein.

DESCRIPTION OF THE PREFERRED EMBODIMENT

Figure 1:
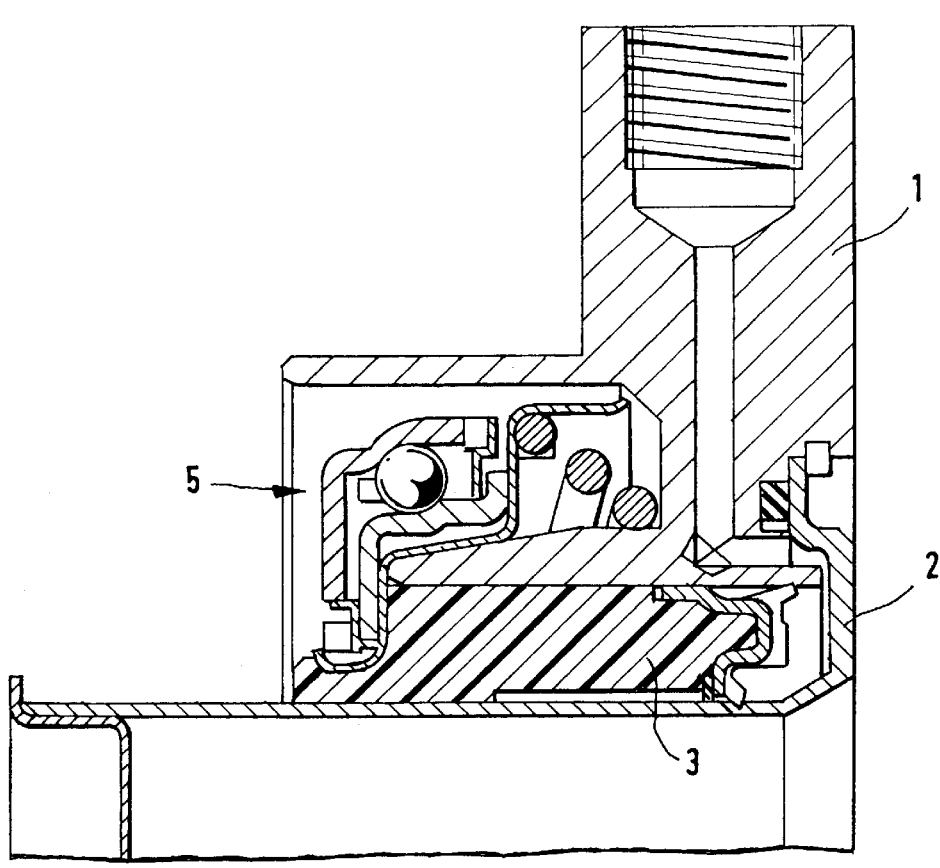
FIG. 1 shows an axial section through a hydraulic annular cylinder with the seal element as claimed by the invention.
Figure 1:
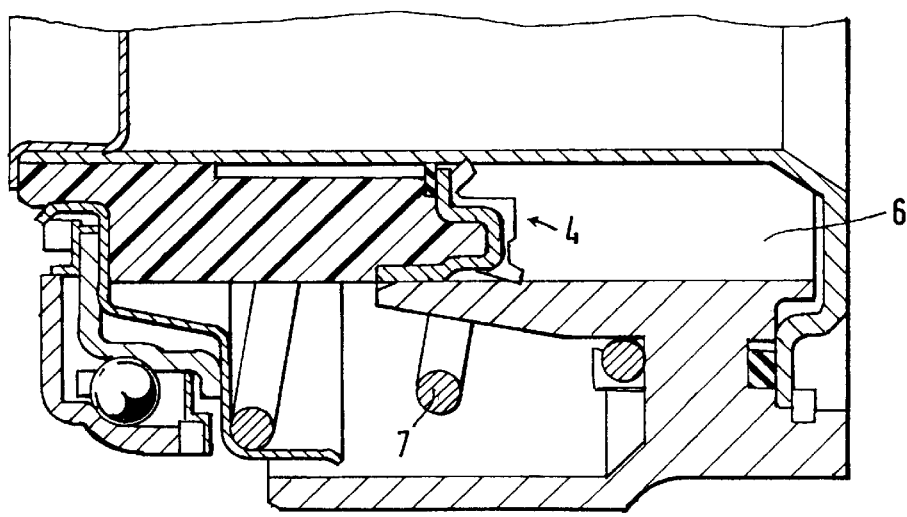
Figure 1A:
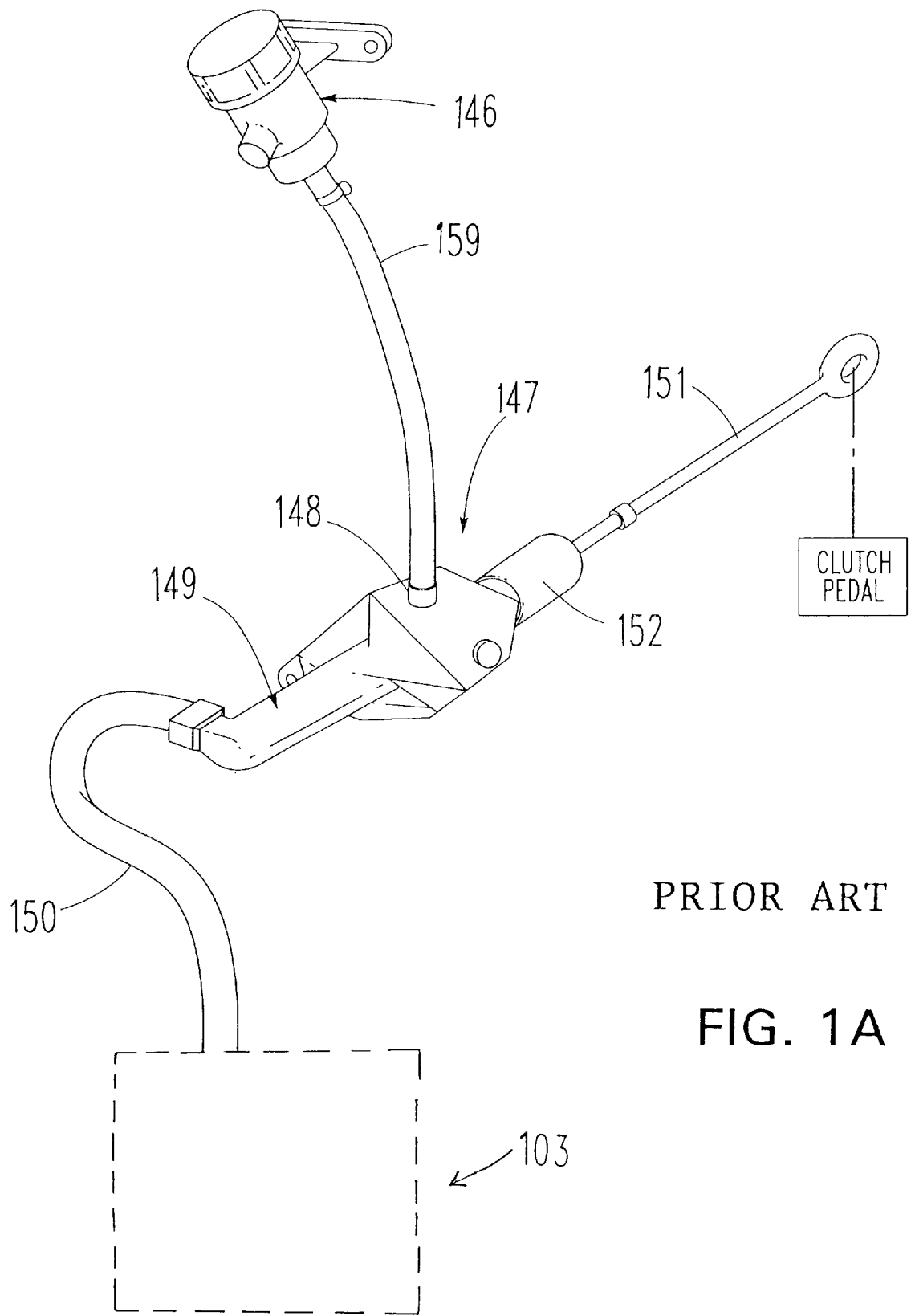
FIGS. 1A and 1B each show examples of hydraulically operated clutch assemblies of the prior art.

FIG. 1A essentially shows a view of one possible use of a cylinder 103 described herein. The cylinder 103, in accordance with the present invention, could be used as a master or a servant cylinder in a hydraulic clutch system. As shown in FIG. 1A, the cylinder 103 is used as a servant cylinder. Such a system can preferably have a remote fluid reservoir 146 and a clutch master cylinder 147, the two being connected to one another by means of a line 159. The clutch master cylinder 147 can preferably be mounted opposite the dash of a motor vehicle, i.e. near the floor where the operator's feet would be, and can preferably be operated essentially directly off of a clutch pedal of the vehicle, preferably be means of a push rod 151, the clutch pedal being shown schematically in FIG. 1A. In addition, the master cylinder 147 can also have a protective boot 152. The cylinder or servant cylinder 103 can preferably be mounted concentrically with a transmission shaft (see FIG. 1).

Figure 1B:
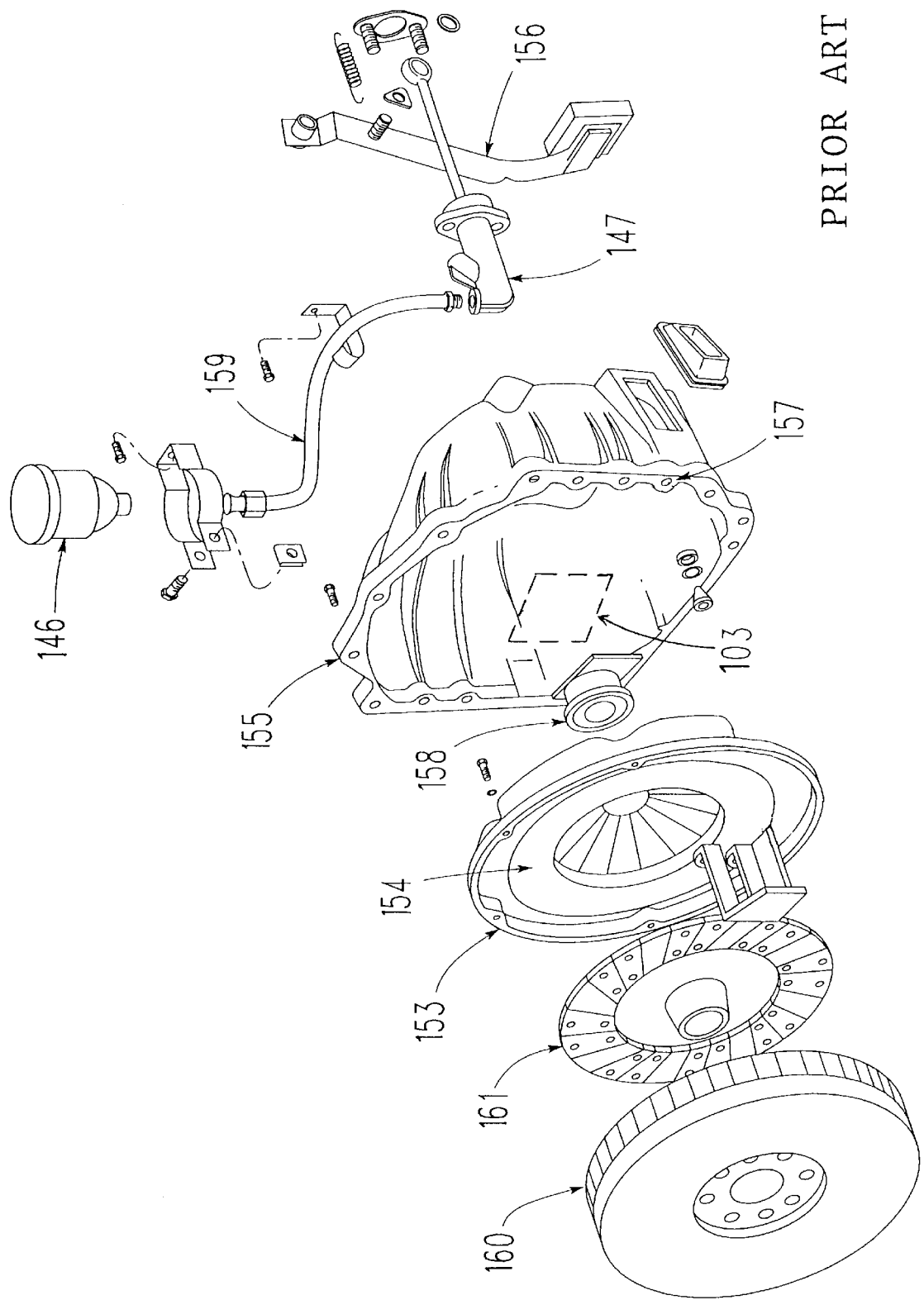

FIG. 1B shows a more complete hydraulic clutch system including a flywheel 160, a clutch disc 161, a clutch cover 153 having a movable pressure plate 154 disposed therein, and a clutch housing 155. The servant cylinder 103 can preferably be connected, to the master cylinder 147, the actual connection of which is not shown here for purposes of simplicity. As discussed above, the master cylinder 147 can preferably be connected to a clutch pedal 156, and to the reservoir 146 by means of line 159.

FIG. 1 shows the slave cylinder for the actuation of a hydraulic motor vehicle clutch which slave cylinder consists essentially of a cylinder housing 1, a cylinder jacket 2 located concentrically in the cylinder housing 1, an annular piston or ring piston 3, a seal element 4 and a release bearing or thrust bearing 5. Between the cylinder housing 1 and the cylinder jacket 2 there is an annular chamber 6 in which annular chamber 6 the annular piston 3 is guided so that the annular piston 3 can move axially. The release bearing or thrust bearing 5, to which release bearing 5 a bias is applied by a compression spring 7, sits on the annular piston 3 and is axially displaced with the annular piston 3, to release the clutch.

Figure 2:
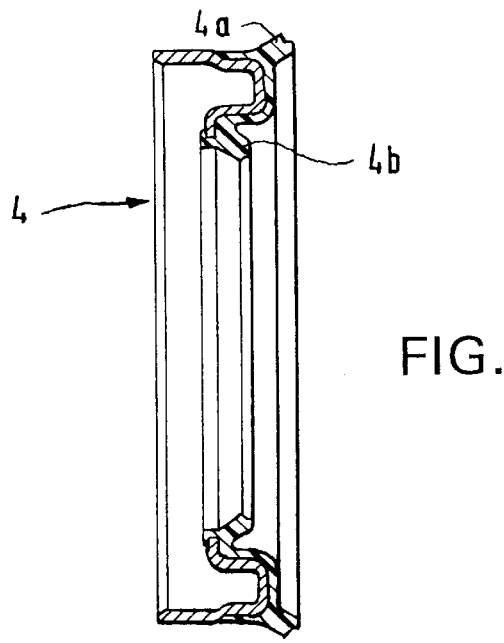
FIG. 2 shows an axial section of the seal element.
Figure 2A:
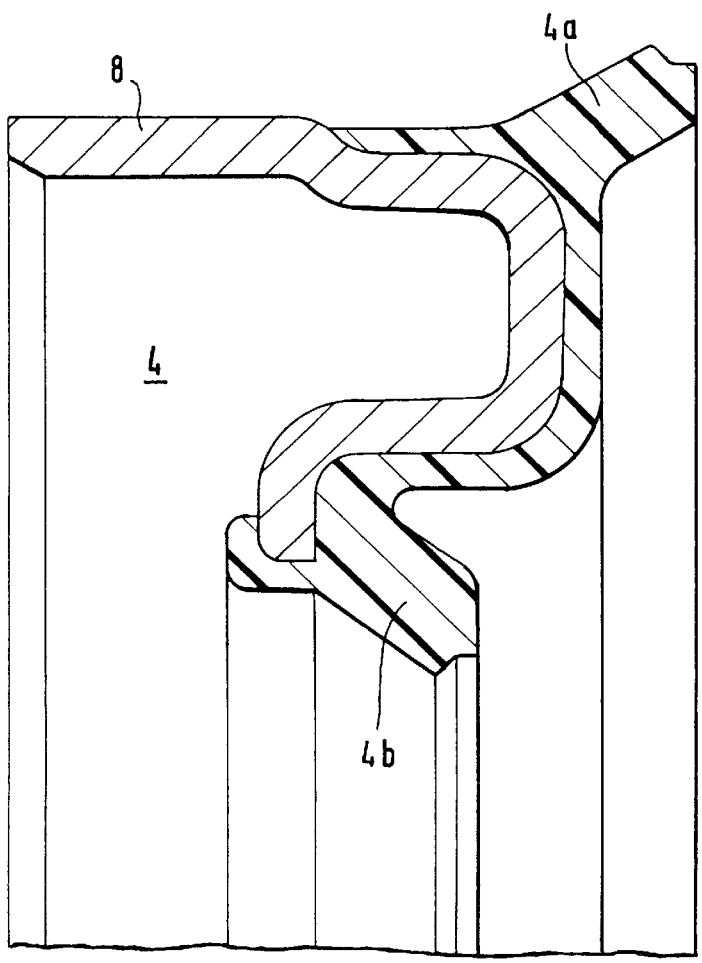
FIG. 2A shows the seal element in axial half-section, in an illustration on a larger scale.

On the end of the slave cylinder which end is located farther from the clutch (the clutch is not shown in the drawing), the seal element 4 is attached or connected axially to the annular piston 3. The connection between the seal element 4 and the annular piston 3 is preferably created by means of an interference fit. As shown in FIG. 1, by means of the seal element 4, the annular piston 3 is sealed radially outward with respect to the cylinder housing 1, and radially inwardly with respect to the cylinder jacket 2. As shown in FIG. 2, seal lip 4a, which seal lip 4a creates the outer seal, is axially offset with respect to an inner seal lip 4b and projects axially beyond the seal lip 4b toward the transmission (not shown here). FIG. 2A shows that the seal lips 4a, 4b can be made of a suitable elastomer material which elastomer material is vulcanized onto a carrier 8 which carrier 8 is bent in the form of a cup. The internal contour of the carrier 8, which carrier 8 is preferably made of steel sheet, matches the external contour of the end of the annular piston 3, so that the carrier 8 can be attached by means of an interference fit, and a more secure seal seat can thereby be achieved.

In one embodiment, the seal lips 4a, 4b can also be vulcanized or molded directly onto the annular piston 3, so that the seal element 4 and annular piston 3 form a single component.

As shown in FIG. 1, as a result of the axial offset of the seal lips 4a, 4b with respect to one another, the cylinder jacket 2 can already be extended radially outward in its terminal area, while there is still a flat seal surface in the cylinder housing 1. As a result of this configuration, the axial length of the slave cylinder can be significantly shorter than corresponding known slave cylinders.

In other words, because the seal lips 4a, 4b are axially offset with respect to one another, the cylinder jacket 2 can be bevelled radially outward toward the transitional area of the cylinder housing 1. This bevelling of the cylinder jacket 2 may allow the axial length of the slave cylinder to be significantly shorter than corresponding known slave cylinders.

One feature of the invention resides broadly in the seal element 4, in particular an elastomer gasket for use in hydraulic annular cylinders, which seal element 4 has a radially outer and a radially inner seal lip 4a, 4b, characterized by the fact that the seal lips 4a, 4b are axially offset from one another.

Another feature of the invention resides broadly in the seal element 4 characterized by the fact that the radially outer seal lip 4a projects in the axial direction beyond the radially inner seal lip 4b.

Yet another feature of the invention resides broadly in the seal element 4 characterized by the fact that the seal lips 4a, 4b are vulcanized onto a cup-shaped carrier 8 and the carrier 8 is realized for an axial attachment on the end of an annular piston 3.

Still another feature of the invention resides broadly in the seal element 4 characterized by the fact that the carrier 8 is made of metal.

A further feature of the invention resides broadly in the slave cylinder which slave cylinder has an annular piston 3 for the hydraulic actuation of a motor vehicle clutch with a seal element 4 as claimed in one or more of the claims 1 to 4.

Another feature of the invention resides broadly in the slave cylinder characterized by the fact that the annular piston 3 and the seal element 4 are realized in one piece.

Yet another feature of the invention resides broadly in the slave cylinder characterized by the fact that the annular piston 3 is made of plastic, and the seal element 4 is molded onto it.

Still another feature of the invention resides broadly in the slave cylinder characterized by the fact that the seal element 4 is axially attached to the ring piston 3.

One example of a hydraulic master and slave cylinder in which the present invention could possibly be utilized is disclosed by the U.S. patent application filed on May 20, 1997, entitled "A Hydraulical Cylinder such as a Clutch Master or Servant Cylinder in a Motor Vehicle Having a Bleed Element", having inventors Thomas Reiss, Olaf Pagels, Boleslaw Tulaczko and Wolfgang Grosspietsch, having Attorney Docket No. NHL-FIS-298, and Ser. No. 08/859,151, which application claims priority from German Application No. 196 48 683.1, filed on Nov. 25, 1996, and inner priority from German Application No. 196 10 188.8, filed on May 20, 1996.

Some examples of hydraulic master and slave cylinders which could possibly utilize the present invention are disclosed by the following U.S. Patents and patent applications: Ser. No. 08/389,012 to Grosspietsch et al., entitled "Cylinder with Plug-in Connection" which was re-filed as a file-wrapper continuation application having Ser. No. 08/821,169, which continuation application issued on Jul. 14, 1998 as U.S. Pat. No. 5,779,019 to Grosspietsch, et al.; U.S. Pat. No. 5,638,934, issued on Jun. 17, 1997 to Link et al., entitled "Hydraulic System with a Multiplicity of Cylinders"; and U.S. Pat. No. 5,704,642, issued on Jan. 6, 1998 to Grosspietsch et al., entitled "Cylinder for Hydraulic Systems, in Particular for Motor Vehicles".

Some examples of clutch assemblies and various components associated therewith which could possibly utilize the present invention may be disclosed in the following U.S. Patents: U.S. Pat. No. 5,211,099 to Grosspietsch et al., entitled "Slave Cylinder for a Hydraulic Actuating System of a Motor Vehicle Friction Clutch"; U.S. Pat. No. 4,745,999 to Brugger et al., entitled "Clutch Operating Cylinder for a Pressure-Medium Operated Clutch"; U.S. Pat. No. 4,807,731 to Collins entitled "Clutch and Brake Assembly"; and U.S. Pat. No. 4,637,505 to Huber entitled "Fluid-Operated Clutch Disengaging Apparatus".

Some examples of hydraulic clutch systems which could possibly utilize the present invention are disclosed by the following U.S. Patents, each of which is assigned to the assignee of the present invention: U.S. Pat. No. 5,211,099 to Grosspietsch et al., dated May 18, 1993 and entitled "Slave Cylinder for a Hydraulic Actuating System of a Motor Vehicle Friction Clutch"; U.S. Pat. No. 5,052,279 to Limbacher and Fadler, dated Oct. 1, 1991 and entitled "Hydraulic Cylinder for a Hydraulic Actuation Arrangement of a Motor Vehicle Friction Clutch"; and U.S. Pat. No. 4,456,111 to Limbacher, dated Jun. 26, 1984 and entitled "Hydraulic Control System for a Clutch".

U.S. Pat. No. 5,211,099, to Voit et al., entitled "Slave Cylinder for a Hydraulic Actuating System of a Motor Vehicle Friction Clutch" and claiming priority from German Patent No. DE 41 09 125 A1 is hereby incorporated by reference as if set forth in its entirety herein.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 27 617.9, filed on Jul. 9, 1996, having inventors Thomas Otto, Boleslaw Tulaczko, Angelika Ebert, and Herbert Voit, and DE-OS 196 27 617.9 and DE-PS 196 27 617.9, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically operated clutch assembly for a motor vehicle, said clutch assembly comprising:

a flywheel defining an axis of rotation and an axial direction parallel to the axis of rotation;

a clutch disc;

a pressure plate for applying an axially directed force to said clutch disc, with respect to the axis of rotation of said flywheel, to engage said clutch disc with said flywheel;

said clutch disc being disposed between said flywheel and said pressure plate;

said clutch disc comprising a friction lining for contacting said pressure plate and said flywheel during engagement of said clutch disc with said flywheel;

an actuator to hydraulically actuate said clutch disc;

said hydraulic actuator comprising:

a cylinder, said cylinder comprising an outer cylinder wall and an inner cylinder wall;

said cylinder having a longitudinal axis;

said outer cylinder wall being disposed further away from the longitudinal axis than said inner cylinder wall;

said outer cylinder wall being disposed coaxial along the longitudinal axis with said inner cylinder wall;

an annular chamber, said annular chamber being disposed between and defined by said outer cylinder wall and said inner cylinder wall, at least a portion of said annular chamber being configured to hold hydraulic fluid therein;

an outlet for providing hydraulic fluid into and out of said annular chamber;

a pedal for applying pressure to the hydraulic fluid within said chamber to operate said pressure plate to apply said axially directed force, at least a portion of said pedal being disposed in a passenger compartment of a motor vehicle;

said annular piston being disposed to slide axially substantially parallel to the longitudinal axis;

a sealing structure being disposed to seal said annular chamber, said sealing structure being disposed adjacent said annular piston;

said sealing structure being disposed between said outer cylinder wall and said inner cylinder wall within said annular chamber;

said sealing structure being disposed to slide axially substantially parallel to the longitudinal axis;

said sealing structure comprising:

an elastomeric body;

sealing lips disposed on said elastomeric body;

said sealing lips consisting of a sole outer sealing lip and a sole inner sealing lip;

said sole outer sealing lip being disposed adjacent said outer cylinder wall, said sole outer sealing lip being disposed to seal said annular chamber at said outer cylinder wall;

said sole inner sealing lip being disposed adjacent said inner cylinder wall, said sole inner sealing lip being disposed to seal said annular chamber at said inner cylinder wall;

each said lip being disposed to protrude substantially from said elastomeric body;

each said lip comprising a root portion and an end portion;

said root portion being attached to said elastomeric body;

said end portion being disposed opposite said root portion and comprising a sealing surface;

said end portion having a distal end disposed away from said root portion;

said sealing surface being disposed solely at said distal end of said end portion;

said elastomeric body and said sole outer sealing lip and said sole inner sealing lip together comprising a continuous, one-piece elastomeric structure;

said sole inner sealing lip comprising a first substantially conical surface and a second substantially conical surface disposed between said root portion and said end portion;

said first conical surface being disposed opposite from said second conical surface;

said sole inner sealing lip having a thickness;

said thickness of said sole inner sealing lip comprising the distance between said first conical surface and said second conical surface;

said thickness of said sole inner sealing lip being substantially similar from said root portion to said end portion;

said elastomeric body comprising a first surface disposed adjacent said first conical surface;

said elastomeric body comprising a second surface disposed adjacent said second conical surface;

said first surface and said second surface each being configured to flare out away from said first conical surface and said second conical surface at said root portion, forming a flare-out portion;

said flare-out portion of said elastomeric body having a width comprising the distance between the first surface and the second surface, which width is substantially greater than the thickness of said sole inner sealing lip;

said sole outer sealing lip comprising a third substantially conical surface and a fourth substantially conical surface disposed between said root portion and said end portion of said sole outer sealing lip;

said third conical surface being disposed opposite from said fourth conical surface of said sole outer sealing lip;

said sole outer sealing lip having a thickness;

said thickness of said sole outer sealing lip comprising the distance between said first conical surface and said second conical surface of said sole outer sealing lip;

said thickness of said sole outer sealing lip being substantially similar from said root portion to said end portion of said sole outer sealing lip;

said elastomeric body comprising a first surface disposed adjacent said third conical surface of said sole outer sealing lip;

said elastomeric body comprising a fourth surface disposed adjacent said fourth conical surface of said sole outer sealing lip;

said third surface and said fourth surface each being configured to flare out away from said third conical surface and said fourth conical surface at said root portion of said sole outer sealing lip, forming a second flare-out portion;

said second flare-out portion of said elastomeric body having a width comprising the distance between the third surface and the fourth surface, which width is substantially greater than the thickness of said sole outer sealing lip;

said sealing structure having a longitudinal axis;

all portions of said sole outer sealing lip being axially offset from all portions of said sole inner sealing lip; and said axial offset being substantially parallel to the longitudinal axis; and a pressure medium connection for connecting said outlet for providing hydraulic fluid to said annular chamber.

2. The clutch assembly according to claim 1 wherein said outer sealing lip extends further than said inner sealing lip from said annular piston.

3. The clutch assembly according to claim 2 wherein said hydraulic actuator further comprises:

a carrier to reinforce said sealing structure;

said carrier being disposed between said annular piston and said sealing structure;

said carrier comprising a substantially cup-shaped configuration;

said carrier comprising a first end and a second end;

said first end of said carrier being disposed toward and attachable to said annular piston; and said sealing structure being configured to adhere to said second end of said carrier.

4. The clutch assembly according to claim 3 wherein said carrier comprises metal.

5. The clutch assembly according to claim 4 wherein:

said annular piston and said sealing structure being configured in combination to comprise a one-piece unit;

said annular piston comprises plastic; and said sealing structure is molded onto said annular piston.

6. The clutch assembly according to claim 5 wherein:

said inner cylinder wall comprises a first portion and a second portion;

said first portion of said inner cylinder wall being disposed adjacent said pressure medium connection;

said second portion of said inner cylinder wall being disposed adjacent said first portion of said inner cylinder wall;

said second portion of said inner cylinder wall being disposed substantially parallel to said longitudinal axis;

said first portion of said inner cylinder wall comprising a bevelled surface;

said bevelled surface of said first portion being disposed towards said outer cylinder wall; and said bevelled surface of said first portion of said inner cylinder wall being disposed closer than said second portion of said inner cylinder wall to said outer cylinder wall.

7. The clutch assembly according to claim 6 wherein said sealing structure is vulcanized onto said second end of said carrier.

8. The clutch assembly according to claim 4 wherein said sealing structure with said carrier is attached to said annular piston.

9. The clutch assembly according to claim 1, wherein:
 each said lip has a length and a width;
 said length is the dimension running between said root portion and said end portion;
 said width is substantially less than said length; and
 said width is substantially transverse to said length.

10. A piston-cylinder arrangement for a hydraulic system in a clutch for a motor vehicle, said piston-cylinder arrangement comprising:
 a hydraulic actuator, said hydraulic actuator comprising:
  a cylinder, said cylinder comprising an outer cylinder wall and an inner cylinder wall;
  said cylinder having a longitudinal axis;
  said outer cylinder wall being disposed further away from the longitudinal axis than said inner cylinder wall;
  said outer cylinder wall being disposed coaxial along the longitudinal axis with said inner cylinder wall;
  an annular chamber, said annular chamber being disposed between and defined by said outer cylinder wall and said inner cylinder wall, at least a portion of said annular chamber being configured to hold hydraulic fluid therein;
  an annular piston, said annular piston being disposed between said outer cylinder wall and said inner cylinder wall within said annular chamber;
  said annular piston being disposed to slide axially substantially parallel to the longitudinal axis;
  a sealing structure being disposed to seal said annular chamber, said sealing structure being disposed adjacent said annular piston;
  said sealing structure being disposed between said outer cylinder wall and said inner cylinder wall within said annular chamber;
  said sealing structure being disposed to slide axially substantially parallel to the longitudinal axis;
  said sealing structure comprising:
   an elastomeric body;
   sealing lips disposed on said elastomeric body;
   said sealing lips consisting of a sole outer sealing lip and a sole inner sealing lip;
   said sole outer sealing lip being disposed adjacent said outer cylinder wall, said sole outer sealing lip being disposed to seal said annular chamber at said outer cylinder wall;
   said sole inner sealing lip being disposed adjacent said inner cylinder wall, said sole inner sealing lip being disposed to seal said annular chamber at said inner cylinder wall;
   each said lip being disposed to protrude substantially from said elastomeric body;
   each said lip comprising a root portion and an end portion;
   said root portion being attached to said elastomeric body;
   said end portion being disposed opposite said root portion and comprising a sealing surface;
   said end portion having a distal end disposed away from said root portion;
   said sealing surface being disposed solely at said distal end of said end portion;
   said elastomeric body and said sole outer sealing lip and said sole inner sealing lip together comprising a continuous, one-piece elastomeric structure;
   said sole inner sealing lip comprising a first substantially conical surface and a second substantially conical surface disposed between said root portion and said end portion;
   said first conical surface being disposed opposite from said second conical surface;
   said sole inner sealing lip having a thickness;
   said thickness of said sole inner sealing lip comprising the distance between said first conical surface and said second conical surface;
   said thickness of said sole inner sealing lip being substantially similar from said root portion to said end portion;
   said elastomeric body comprising a first surface disposed adjacent said first conical surface;
   said elastomeric body comprising a second surface disposed adjacent said second conical surface;
   said first surface and said second surface each being configured to flare out away from said first conical surface and said second conical surface at said root portion, forming a flare-out portion;
   said flare-out portion of said elastomeric body having a width comprising the distance between the first surface and the second surface, which width is substantially greater than the thickness of said sole inner sealing lip;
   said sole outer sealing lip comprising a third substantially conical surface and a fourth substantially conical surface disposed between said root portion and said end portion of said sole outer sealing lip;
   said third conical surface being disposed opposite from said fourth conical surface of said sole outer sealing lip;
   said sole outer sealing lip having a thickness;
   said thickness of said sole outer sealing lip comprising the distance between said third conical surface and said fourth conical surface of said sole outer sealing lip;
   said thickness of said sole outer sealing lip being substantially similar from said root portion to said end portion of said sole outer sealing lip;
   said elastomeric body comprising a third surface disposed adjacent said third conical surface of said sole outer sealing lip;
   said elastomeric body comprising a fourth surface disposed adjacent said fourth conical surface of said sole outer sealing lip;
   said third surface and said fourth surface each being configured to flare out away from said third conical surface and said fourth conical surface at said root portion of said sole outer sealing lip, forming a second flare-out portion;
   said second flare-out portion of said elastomeric body having a width comprising the distance between the third surface and the fourth surface, which width is substantially greater than the thickness of said sole outer sealing lip;
   said sealing structure having a longitudinal axis;
   all portions of said sole outer sealing lip being axially offset from all portions of said sole inner sealing lip; and
   said axial offset being substantially parallel to the longitudinal axis; and a pressure medium connection for providing hydraulic fluid to said annular chamber.

11. The piston-cylinder arrangement according to claim 1 wherein said outer sealing lip extends further than said inner sealing lip from said annular piston.

12. The piston-cylinder arrangement according to claim 11 wherein said hydraulic actuator further comprises:
   a carrier to reinforce said sealing structure;
   said carrier being disposed between said annular piston and said sealing structure;
   said carrier comprising a substantially cup-shaped configuration;
   said carrier comprising a first end and a second end;
   said first end of said carrier being disposed towards and attachable to said annular piston; and
   said sealing structure being configured to adhere to said second end of said carrier.

13. The piston-cylinder arrangement according to claim 12 wherein said carrier comprises metal.

14. The piston-cylinder arrangement according to claim 13 wherein:
   said annular piston and said sealing structure being configured in combination to comprise a one-piece unit;
   said annular piston comprises plastic; and
   said sealing structure is molded onto said annular piston.

15. The piston-cylinder arrangement according to claim 14 wherein:
   said inner cylinder wall comprises a first portion and a second portion;
   said first portion of said inner cylinder wall being disposed adjacent said pressure medium connection;
   said second portion of said inner cylinder wall being disposed adjacent said first portion of said inner cylinder wall;
   said second portion of said inner cylinder wall being disposed substantially parallel to said longitudinal axis;
   said first portion of said inner cylinder wall comprising a bevelled surface;
   said bevelled surface of said first portion being disposed toward said outer cylinder wall; and
   said bevelled surface of said first portion of said inner cylinder wall being disposed closer than said second portion of said inner cylinder wall to said outer cylinder wall;
   said sealing structure is vulcanized onto said second end of said carrier.

16. The piston-cylinder arrangement according to claim 13 wherein said sealing structure with said carrier is attached to said annular piston.

17. The piston-cylinder arrangement according to claim 10, wherein:
   each said lip has a length and a width;
   said length is the dimension running between said root portion and said end portion;
   said width is substantially less than said length; and
   said width is substantially transverse to said length.

18. A sealing arrangement for a piston-cylinder arrangement for a hydraulic system having a slave cylinder in a motor vehicle, said sealing arrangement comprising:
   a sealing structure to seal the piston-cylinder arrangement;
   said sealing structure comprising:
   an elastomeric body;
   sealing lips disposed on said elastomeric body;
   said sealing lips consisting of a sole elastomeric outer sealing lip and a sole elastomeric inner sealing lip;
   each said lip being disposed to protrude substantially from said body;
   each said lip comprising a root portion and an end portion;
   said root portion being attached to said elastomeric body;
   said end portion being disposed opposite said root portion and comprising a sealing surface;
   said end portion having a distal end disposed away from said root portion;
   said sealing surface being disposed solely at said distal end of said end portion;
   said elastomeric body and said sole outer sealing lip and said sole inner sealing lip together comprising a continuous, one-piece elastomeric structure;
   said sole inner sealing lip comprising a first substantially conical surface and a second substantially conical surface disposed between said root portion and said end portion;
   said first conical surface being disposed opposite from said second conical surface;
   said sole inner sealing lip having a thickness;
   said thickness of said sole inner sealing lip comprising the distance between said first conical surface and said second conical surface;
   said thickness of said sole inner sealing lip being substantially similar from said root portion to said end portion;
   said elastomeric body comprising a first surface disposed adjacent said first conical surface;
   said elastomeric body comprising a second surface disposed adjacent said second conical surface;
   said first surface and said second surface each being configured to flare out away from said first conical surface and said second conical surface at said root portion, forming a flare-out portion;
   said flare-out portion of said elastomeric body having a width comprising the distance between the first surface and the second surface, which width is substantially greater than the thickness of said sole inner sealing lip;
   said sole outer sealing lip comprising a third substantially conical surface and a fourth substantially conical surface disposed between said root portion and said end portion of said sole outer sealing lip;
   said third conical surface being disposed opposite from said fourth conical surface of said sole outer sealing lip;
   said sole outer sealing lip having a thickness;
   said thickness of said sole outer sealing lip comprising the distance between said third conical surface and said fourth conical surface of said sole outer sealing lips;
   said thickness of said sole outer sealing lip being substantially similar from said root portion to said end portion of said sole outer sealing lip;
   said elastomeric body comprising a third surface disposed adjacent said third conical surface of said sole outer sealing lip;
   said elastomeric body comprising a fourth surface disposed adjacent said fourth conical surface of said sole outer sealing lip;
   said first surface and said fourth surface each being configured to flare out away from said third conical surface and said fourth conical surface at said root portion of said sole outer sealing lip, forming a second flare-out portion;

said second flare-out portion of said elastomeric body having a width comprising the distance between the third surface and the fourth surface, which width is substantially greater than the thickness of said sole outer sealing lip;

said sealing structure having a longitudinal axis;

all portions of said sole outer sealing lip being axially offset from all portions of said sole inner sealing lip; and said axial offset being substantially parallel to the longitudinal axis.

19. The sealing arrangement according to claim 18, wherein:

each said lip has a length and a width;

said length is the dimension running between said root portion and said end portion;

said width is substantially less than said length; and said width is substantially transverse to said length.

20. The sealing arrangement according to claim 19 wherein:

said sealing arrangement is mounted on a piston;

said outer sealing lip extends further than said inner sealing lip from the piston onto which said sealing arrangement is mounted;

a carrier to reinforce said sealing structure;

said carrier comprises a substantially cup-shaped configuration;

said carrier comprises metal;

the piston and said sealing arrangement comprise a one-piece unit; and said sealing structure being vulcanized onto said carrier.

* * * * *

UNITED STATES PATENT AND TRADEMARK OFFICE
CERTIFICATE OF CORRECTION

PATENT NO.   : 6,092,637
DATED        : July 25, 2000
INVENTOR(S)  : Thomas Otto, Boleslaw Tulaczko, Angelika Ebert, and Herbert Voit It is certified that error appears in the above-identified patent and that said Letters Patent is hereby corrected as shown below:

Column 5,
Line 13, after 'No.' , delete "5,704,642," and insert -- 5, 704,462, --.

Column 8,
Line 25, claim 2, after 'claim', delete "1" and insert -- 9 --.

Column 11,
Line 3, claim 11, after 'claim', delete "1" and insert -- 17 --.

Signed and Sealed this

Eleventh Day of September, 2001

Attest:

NICHOLAS P. GODICI
*Attesting Officer*   *Acting Director of the United States Patent and Trademark Office*